United States Patent Office 3,395,818
Patented Aug. 6, 1968

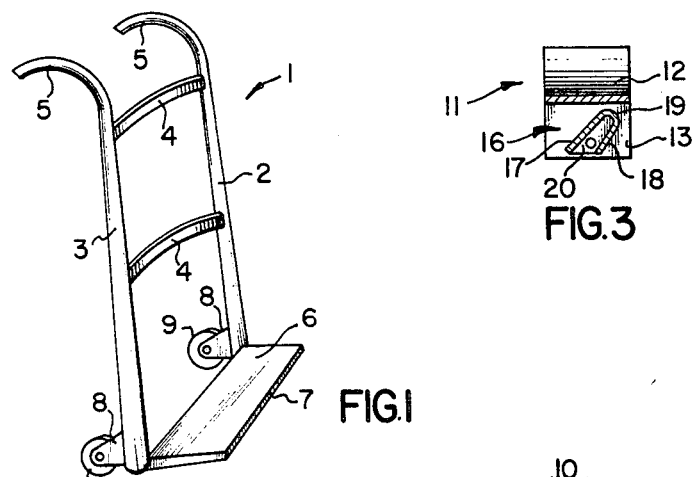
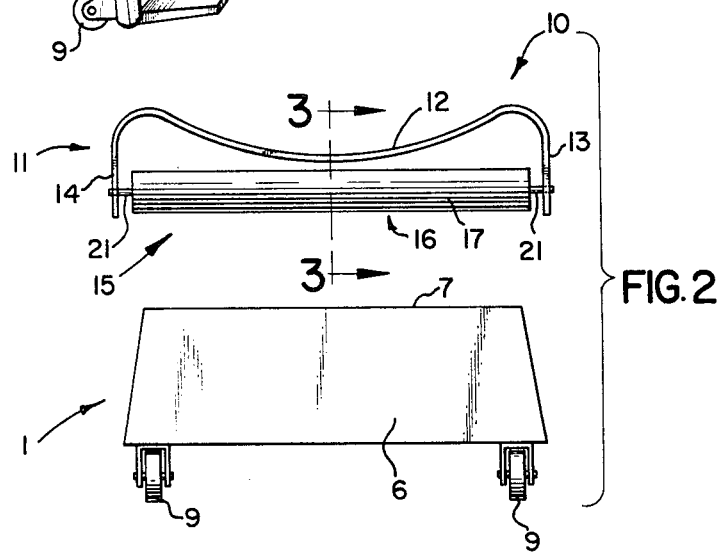
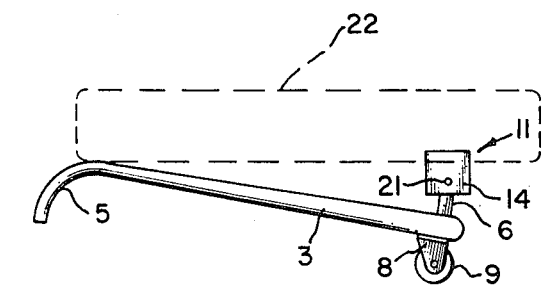

3,395,818
HAND TRUCK ATTACHMENT
Anthony L. Diebold, Saginaw, Mich., assignor to Great Lakes Express Co., Saginaw, Mich., a corporation of Michigan
Filed Sept. 2, 1966, Ser. No. 576,891
4 Claims. (Cl. 214—372)

ABSTRACT OF THE DISCLOSURE

An attachment for a hand truck having a forwardly projecting tongue, the attachment comprising a concave load supporting band having downturned ends to which is pivotally connected a V-shaped member adapted removably to accommodate the forward end of the truck tongue.

---

This invention relates to an attachment for a hand truck or the like and more particularly to a detachable cradle device adapted for attachment to the load supporting tongue of a hand truck so as to enable the latter to be used in the transporting of elongated cylindrical objects without their being damaged.

Conventional hand trucks adapted for use in transporting cubical objects customarily employ a wheeled frame having at one end a forwardly projecting tongue terminating in a free forward end. The tongue is adapted to engage and support the bottom of the object to be transported and it is conventional practice to provide a fairly thin, planar tongue so as to facilitate its being interposed between the article to be transported and the surface on which the article normally rests. Due to the thinness of the tongue, its forward end may be relatively sharp. If a truck having such a tongue is utilized to transport a heavy cylindrical object, such as a roll of linoleum, and if the linoleum roll is arranged on the truck in such manner that the roll rests upon the forward end of the tongue, it is not unusual for the outer surface of the roll to be pierced or severely scarred by the tongue. Even if care is taken to avoid piercing or otherwise damaging such a roll, it is not unusual for the roll to slide or roll off the tongue and become damaged by falling on the floor or other surface over which the truck is being moved. The problems in trucking cubical articles on the one hand and cylindrical articles on the other hand obviously can be overcome by utilizing a pair of hand trucks, one of which is adapted to handle cubical products, and the other of which is adapted to handle cylindrical products. Such a solution is not altogether satisfactory, however, for a number of reasons. For example, the cost of providing two separate hand trucks is objectionable. Moreover, the provision of more than one hand truck requires storage space which otherwise could be used to greater advantage, particularly in the trucking industry.

An object of this invention is to provide a hand truck attachment which enables a truck adapted primarily for use in conjunction with cubical or the like articles to be converted to one capable of handling cylindrical articles without damaging the latter.

Another object of the invention is to provide an attachment of the character described and which minimizes greatly the possibility that a cylindrical article may roll off the hand truck.

A further object of the invention is to provide a hand truck attachment of the character referred to and which is attachable to and detachable from the hand truck without the necessity of using any tools.

Another object of the invention is to provide such an attachment and which, in use, is automatically adjustable so as to provide maximum support for a cylindrical object.

A further object of the invention is to provide a hand truck attachment which is small in size, light in weight, and durable in use.

Other objects and advantages of the invention will be pointed out specifically or will become apparent from the following description when it is considered in conjunction with the appended claims and the accompanying drawing, in which:

FIGURE 1 is a perspective view of a typical hand truck with which an attachment constructed in accordance with the invention is adapted for use;

FIGURE 2 is an exploded, end elevational view of the hand truck and the attachment preparatory to mounting the attachment on the hand truck;

FIGURE 3 is a transverse sectional view taken on the line 3—3 of FIGURE 2; and

FIGURE 4 is a side elevational view illustrating the attachment mounted on the hand truck and in use to support an elongated, cylindrical object.

Apparatus constructed in accordance with the invention is adapted for use in conjunction with a conventional hand truck 1 having a pair of parallel side frame members 2 and 3 joined together by transverse bars 4 and terminating at corresponding ends in curved handle members 5. At their opposite ends, the frame members 2 and 3 are joined to a thin, flat, forwardly projecting load supporting tongue 6 which terminates at its forward end in a straight edge 7. Journaled in brackets 8 mounted on the frame members 2 and 3 are wheels 9. The hand truck forms no part of the invention per se aside from the manner in which parts of the hand truck cooperate with parts of the apparatus yet to be described.

An attachment constructed according to the invention is designated generally by the reference character 10 and comprises a support member 11 formed of a relatively wide band of metal or other suitable material and having an arcuate, upwardly concave load supporting portion 12 terminating at opposite ends in substantially parallel end portions 13 and 14. The distance between the end portions 13 and 14 should be greater than the length of the tongue 6 on which the attachment is adapted to be mounted.

Means for attaching the load supporting member 11 on the hand truck tongue is designated generally by the reference character 15 and comprises a substantially V-shaped, trough-like member 16 having side walls 17 and 18 which diverge from a connecting web 19. The member 16 preferably is provided at each end with an end wall 22 to which is secured a longitudinally extending pivot pin 21 which rotatably extends through an opening formed in the adjacent end portions 13 and 14 of the member 11. The attaching member 16 thus is pivotally mounted on the load supporting member 11 for relative rocking movements about an axis passing through both of the end members 13 and 14. As is best indicated in FIGURES 2 and 3, the attachment member 15 is located wholly within the confines of the member 11 and its length is sufficient to accommodate the free end of the tongue 6.

To condition the attachment 10 for use, the hand truck 1 may be rocked to a position in which the straight edge 7 of the tongue 6 projects upwardly. The attachment 10 then may be mounted on the tongue 6 by inserting the straight edge 7 into the trough member 16. The end walls 20 of the member 16 will engage the side edges of the tongue 6 so as to prevent shifting of the attachment 10 laterally of the tongue. The supporting member 11, however, is capable of rotation relative to the tongue 6 because of the pivotal connection of the member 11 to the member 15.

When the attachment 10 is installed on the hand truck, an elongated, cylindrical object 22 may be supported on the member 11 and on one of the cross bars 4 in the manner indicated in FIGURE 4. The ability of the member 11 to rock about the axis of the pivot pins 21 enables the full width of the support portion 12 to engage the outer surface of the article 22, thereby distributing the weight of the latter over an area considerably greater than that of the free end of the tongue 6. Consequently, the risk of damaging the outer surface of the article 22 is greatly minimized. Due to the concavity of the support portion 12, the article 22 tends to center itself relatively to the member 11, thereby minimizing the risk of the object's rolling off the support member. Moreover, the concavity of the portion 12 effects centering of the weight of the article 22 so as to make it easier for the hand truck to be controlled.

The attachment 10 may be removed from the tongue 6 simply by withdrawing the latter from the member 16.

If desired, the pivotal mounting of the member 16 on the member 11 may be dispensed with, in which case the member 16 may be welded or otherwise suitably fixed to the end portions 13 and 14 of the member 11. In this instance the end walls 20 also may be eliminated inasmuch as the end portions 13 and 14 of the member 11 will prevent endwise separation of the attachment from the tongue 6. The fixed mounting of the member 16 on the member 11 is not as desirable as the pivotal mounting thereof inasmuch as the member 11 then is incapable of automatic adjustment to the contour of the article to be supported thereby. Nevertheless, a fixed arrangement may be satisfactory for some purposes.

The disclosed embodiment is representative of a presently preferred form of the invention but is intended to be illustrative rather than definitive thereof. The invention is defined in the claims.

I claim:

1. An attachment for a hand truck or the like having a forwardly projecting tongue terminating in a free forward end, said attachment comprising a load supporting member having a pair of substantially parallel end portions spaced apart a distance greater than the length of said tongue and joined by a flat, upwardly concave band portion; an attaching member interposed and substantially spanning the space between the end portions of said load supporting member, said attaching member having an opening therein for the removable accommodation of the forward end of said tongue; and means mounting said attaching member on said load supporting member.

2. The attachment set forth in claim 1 wherein said mounting means comprises a pivotal connection between said attaching member and said load supporting member for enabling relative rotation between said members.

3. The attachment set forth in claim 2 wherein said pivotal connection is between each of said end portions and said attaching member.

4. The attachment set forth in claim 1 wherein said attaching member is V-shaped in cross section.

References Cited

UNITED STATES PATENTS

| | | | |
|---|---|---|---|
| 1,215,718 | 2/1917 | Salisbury | 214—372 |
| 1,636,574 | 7/1927 | Perry | 280—47.27 X |
| 2,649,981 | 8/1953 | Tessier. | |
| 2,808,163 | 10/1957 | Petzke et al. | 280—47.24 X |
| 2,893,577 | 7/1959 | Swanson | 214—372 |

FOREIGN PATENTS 532,737  1/1941  Great Britain.

BENJAMIN HERSH, *Primary Examiner.*

J. A. PEKAR, *Assistant Examiner.*